United States Patent [19]

Richards

[11] Patent Number: 4,487,621
[45] Date of Patent: Dec. 11, 1984

[54] METHOD OF SEALING GLASS FURNACES TO PREVENT AIR LEAKAGE

[75] Inventor: Ray S. Richards, Sylvania, Ohio

[73] Assignee: Owens-Illinois, Inc., Toledo, Ohio

[21] Appl. No.: 535,514

[22] Filed: Sep. 26, 1983

[51] Int. Cl.³ .............................................. C03B 5/42
[52] U.S. Cl. .......................................... 65/27; 65/337; 65/374.1; 65/374.13; 432/180; 432/248; 432/265
[58] Field of Search ..................... 65/374.1, 374.13, 27, 65/337; 432/248, 180, 264, 265

[56] References Cited

U.S. PATENT DOCUMENTS 2,269,445  1/1942  Easter .................................. 65/27 X
3,676,099  7/1972  Fultz .................................. 65/337 X
3,816,163  6/1974  Yoldas ............................ 65/374.1 X
4,246,313  1/1981  Stengle, Jr. ....................... 65/374.1

OTHER PUBLICATIONS

"Hot Repair of Glass Furnaces" The Glass Industry, Aug. 1982, by E. R. Plumat, pp. 16, 17, 18, 19, 20, 39.

Primary Examiner—Arthur Kellogg
Attorney, Agent, or Firm—Thomas L. Farquer; M. E. Click

[57] ABSTRACT

The outside walls of the regenerator of a glass melting furnace is coated with a high temperature silicone elastomer. Several coats are applied in those areas of high differential pressure and low relative resistance to air flow therethrough. The cleanout panels in particular are provided with several coats.

10 Claims, 2 Drawing Figures methods of sealing glass furnaces to prevent air leakage

METHOD OF SEALING GLASS FURNACES TO PREVENT AIR LEAKAGE

BACKGROUND OF THE INVENTION

In the past, it has been the practice in constructing glass melting furnaces, particularly of the regenerative type, to provide the brick regenerators which extend from below the floor of the glass plant to approximately the height, or slightly thereabove, of the melter itself. Each of the checkerworks or regenerators extends along the full length of the melter and is provided on the outside thereof with cleanout panels, usually having a panel associated with each of the firing ports. The cleanout panel associated with the first firing port closest to the charging end of the melter generally is provided in the end of the regenerator, while the other cleanout panels usually correspond to the firing ports with perhaps the last firing port having its cleanout panels in the opposite end wall of the furnace regenerative, checkerwork structure. As the melter is put in service, the products of combustion exhaust through the side ports and pass down through the checkerworks on the exhaust side, heating the checkerworks and the bricks which form the checkerworks will pick up the temperature of the exhaust air. On the reverse cycle of operation, the incoming air, which is used to support combustion within the melter, is passed upwardly through the previously heated checkerworks, and thus the air becomes preheated at the time that it is introduced into the melter, and the opposite side then becomes the exhaust side of the system. This cycling of the combustion and preheat air and the attendant exhaust of the products of combustion reverses and takes place in approximately thirty minute intervals. During this time, as can readily be seen, the checkerworks heat up and cool down to a certain degree in the cycle of operation of the side port regenerative furnaces. End port furnaces, which provide a firing system where the firing occurs through ports in the end of the furnace and exhaust is also through the end of the furnace, still have the same reversing operations. The checkerworks, however, are generally built at the firing end of the furnace.

In these operations, the heatup and cool down that occurs within the checkerworks normally results in a significant amount of expansion and contraction and thereby creates cracks and other possible air movement paths from the inside or outside of the checkerworks or regenerators into the atmosphere or interior thereof. This may occur as an infiltration of cool air into the hot checkerworks at a position on the exhaust side which is usually at a negative pressure or also can result in the preheated air escaping through the wall in areas where it is not desirable. In the area of the cleanout panels, it has been a fairly well known phenomenon that the outside air and the preheated air will move through the cleanout panels to a much greater extent than the areas which are much thicker in wall thickness. Further, the cleanout panels are formed of a plurality of holes alternating with larger thicknesses of brick, with the holes being the access ports through which air lances are used to clean the interior of the checkerworks and to blow down the collected dust particles to the lower cleanout canals. These holes are generally poorly plugged with tapered soft bricks and a great deal of leakage occurs at these locations.

SUMMARY OF THE INVENTION

This invention is directed to the application of an elastic coating over the exterior of a furnace structure built of refractory bricks where the brick works are covered by a silicone elastomer in several coats to significantly reduce the movement of air through the wall. Of particular need are those areas of a glass melting furnace regenerator structure that have cleanout panels provided which are formed of cleanout ports sealed by tapered blocks.

DETAILED DESCRIPTION OF THE DRAWINGS

Figure 1:
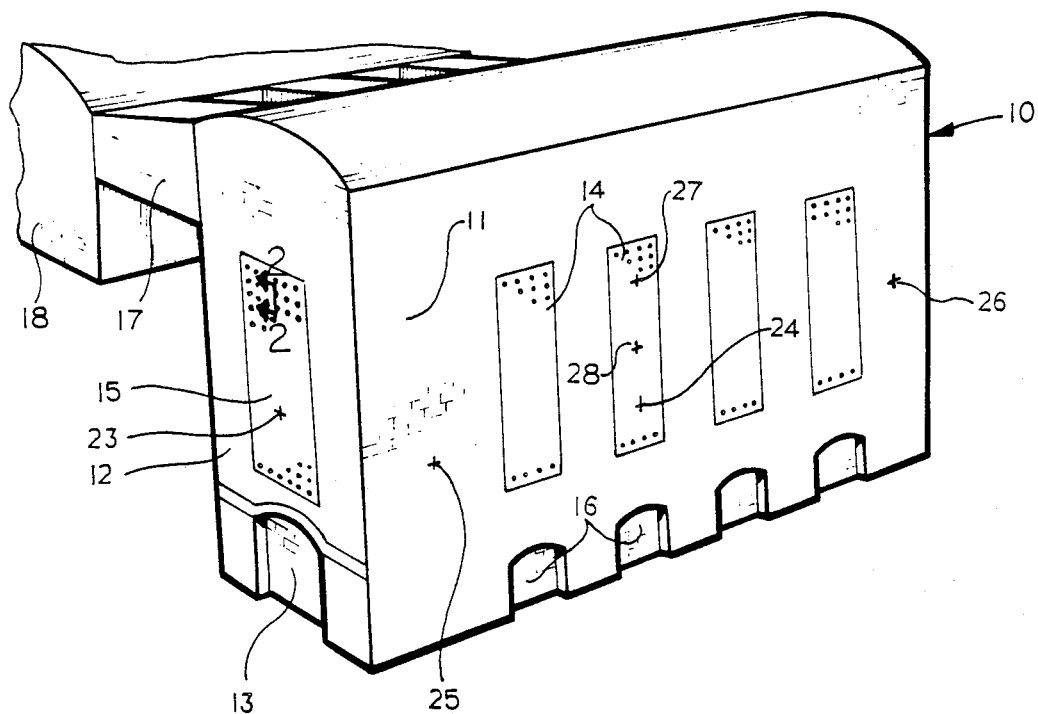
FIG. 1 is a perspective view of a typical side port regenerator of a glass melting furnace.

As viewed in FIG. 1, the regenerator 10 is composed of a brick side wall 11 and an end wall 12. Opening into the end wall 12 is a lower canal 13, which will extend along the full length of the regenerator 10. The canal 13, or port actually, extends only beneath the area at the end of the furnace. The side wall of the regenerator, as shown in FIG. 1, is provided with a series of four cleanout panels 14. Similarly, the end wall 12 is provided with a cleanout panel 15. Beneath each of the side wall cleanout panels 14 is a comparably sized cleanout canal 16. Air from the blower (not shown) is fed upwardly from beneath through the interior of the regenerator 10, it being understood the regenerator 10 is a brick walled structure having a plurality of heat-absorbing checkerwork brick configurations internally thereof such that the air being introduced from below will pick up heat and become preheated at the time it arrives at the upper, domed area of the regenerator. In this domed area, the regenerator is formed with a plenum chamber (not shown) and the plenum chamber communicates through a plurality of ports which open through archways 17, which in turn are open to the upper interior of the glass melter 18 at spaced burner ports.

Figure 2:
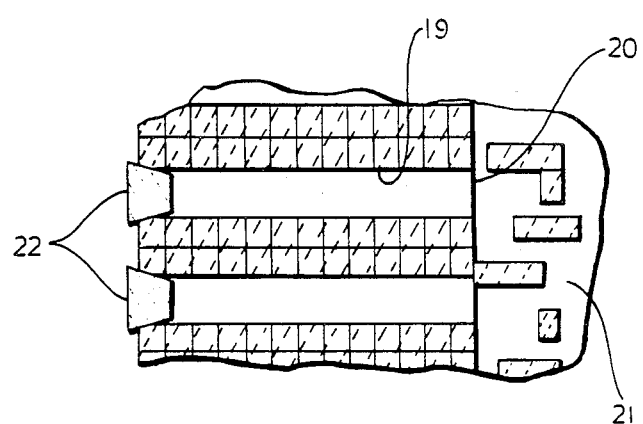
FIG. 2 is a sectional view, on an enlarged scale, taken at line 3—3 of FIG. 1.

It should be understood that while a single regenerator 10 is shown in FIG. 1, an essentially identical regenerator will be positioned on the opposite side of the furnace 18, and when the incoming air is passing through the regenerator 10 and being preheated thereby, hot combustion products are exhausting through the burner ports on the opposite side of the furnace into a regenerator position on the opposite side. On the reverse cycle, the regenerator 10 will be receiving the hot exhaust gases from the melter 18 through the archways 17 into the upper end thereof and the hot exhaust then passes downward through the checkerworks contained within the regenerator and then out from the bottom thereof, through a canal which connects to a reversing valve, and the reversing valve is connected by a tunnel to a stack. Each of the cleanout panels 14 or 15, as shown in detail in FIG. 2, is in the form of an opening extending through the thickness of the regenerator wall. The inner end of the opening 19 opens into the interior 21, which in effect is the checkerwork zone within the regenerator 10. The opposite end of the opening 19 is closed by a tapered block 22. The block is sealed in the opening by mortar but the block is usually made of a permeable refractory brick and the wall section surrounding the block is also permeable. In actual practice, these blocks may be approximately 4½ inches square in the outside, cross-sectional dimension and then tapered down to a somewhat smaller inner dimension. These blocks 22 may be typically 5 inches long. Each of the openings 19 in effect constitutes a cleanout port and the tapered blocks 22 may be removed either individually or as groups, and once removed, air lances will be inserted through the ports 19 and air under pressure blown around within the interior of the checkerworks to loosen and in effect shake down the accumulated particles within the checkerworks so that they may settle down toward the bottom of the areas beneath the cleanout panels. This cleaning operation is repeated a number of times until it becomes apparent that a significant portion of the checkerworks have become clogged or filled with particles of combustion and some batch particles, at which time the regenerator will be put out of service for a major cleanout. During cleanout, the lower chambers 13 and 16 may be entered, and the accumulated debris which has been permitted to fall down into these areas will be removed. Also, the ports 19 provide viewing access to portions of the interior checkerworks so that it may be observed as to the condition of the checkers, and also it is possible to become aware of significant structural failures that might be occurring within the interior of the checkerworks. Furthermore, since the regenerator is a generally ceramic brick structure which is alternately subjected to heating and cooling cycles, typically of 20 to 30 minute reversal intervals, the walls thereof may become cracked due to the expansion and contraction created by the temperature cycling. Furthermore, as might be expected, on the exhaust cycle there will be a pressure drop created between the outside and the interior of the checkerworks, which pressure drop will set up the movement of hot gases out of the checkerwork, and consequently cold air leakage into the exhaust regenerator. This dilution of the exhaust gases by colder air lowers the temperature of the exhaust gases and thus lowers the efficiency of the regenerator. Further, on the reverse cycle, the flow of ambient air to be preheated within the checkers will not obtain as high a temperature. Further, due to the pressure differential, if there are cracks in the walls, the ambient air will infiltrate the interior of the checkerworks. This infiltration of air and movement of air through the walls of the regenerator into the checkerworks is a disrupting influence to the normal heat balance operation of the melter or furnace. In this light, Applicant has found that by providing an exterior sealing coating over the entire external surface of the regenerator, and in particular a continuous coating over those exterior surfaces of the cleanout panels, a significant reduction in the passage of air through the walls of the regenerator is effected.

It has been the practice in the past to use ceramic coatings of one sort or another and cement type coatings on the exterior of the regenerators to seal the permeable insulating brick and any cracks which might occur, and many of these sealing materials have not proven satisfactory, inasmuch as they themselves frequently are porous and therefore air again may move relatively freely through these coatings. Developments of high temperature, flexible, rubber-like materials such as a water based, silicone elastomer, sold by Dow Corning under the designation Q3-5025, have led to a coating that will provide a significant reduction in air flow through the coated wall.

As an example, Applicant, on a regenerator of the type shown in FIG. 1, made measurements of air flow through the wall of the end cleanout panel at position 23, as shown in the cleanout panel 15. The flow rate at this point through the wall of the cleanout panel was found to be 415 standard cubic feet per hour (SCFH) per square foot, with an internal pressure of −0.35 inches of water. After this location 23 and the area therearound was covered with the rubber-like silicone coating of one application, it was found that the flow rate had been reduced to approximately 240 SCFH, and after a second application of the silicone coating, the flow was further reduced to approximately 115 SCFH. A third coating was applied and this reduced the flow to about 75 SCFH. At a location 24 in the panel 14, it was found that there was a flow of over 460 SCFH. After the application of a first coating of the silicone elastomer, the flow rate was reduced to about 230 SCFH. With a second coat applied, the flow rate was reduced to 110 SCFH, and after a third coat, the flow rate was about 40 SCFH. These readings were taken where the internal pressure was −0.31 inches of water. Several other locations were measured, for example, the location 25 between the first side cleanout panel and the end of the regenerator was found to be an area of high differential pressure, but there was no apparent air leakage. A similar result was found to occur at a location 26 between the last panel 14 in the side wall and the other end wall of the regenerator. The location 27 in the upper portion of the second cleanout panel experienced an extremely low differential pressure of less than 0.01 inches of water and a leakage rate of about 3 SCFH per square foot.

A location 28, intermediate the locations 24 and 26, had a measured leakage rate of 5 SCFH per square foot. After one application of silicone elastomer, there appeared to be no leakage. High leakage areas were encountered in cleanout panel areas and were accompanied by high differential pressure.

In some areas, there was high differential pressure but no apparent leakage due perhaps to the fact that in these areas, particularly those where there are no cleanout ports, the interior of the regenerator becomes glazed over by the heated batch particles being melted and forming a seal. Further, these areas do not have the cleanout ports which obviously are too large and cold to glaze over.

In addition, when the coated areas were retested after approximately one month of furnace operation, it was found that there was very little change in the readings obtained at the locations 24 and 27.

The method of applying the silicone elastomer was found to be important from the standpoint that the refractory walls of the regenerator are too hot to coat directly. Therefore, a mist of water was applied to the cleaned and patched walls immediately before the silicone was applied with a brush or gun. This procedure was repeated for each additional coat.

The use of a water mist to cool the bricks also allows the coating to wet the bricks and form a coating. The ability of the silicone elastomer to bridge cracks or crevices and maintain an integral skin is a function of the tensile strength and thickness. Since the elasticity is fairly high, it has the ability to span small cracks, but only in relationship to the coating thickness. Thus it can be seen that with several coats, the covering ability is increased as the thicker resulting coat has a much greater bridging ability due to its greater elasticity.

When there are large cracks the size of one-sixteenth of an inch or greater, it is found to be advantageous to cover these cracks with a bridging material, such as high temperature cement. As previously mentioned, the high temperature cements are fairly porous when it comes to air infiltration such as being dealt with in the present invention. Therefore, the coating with the silicone elastomer that can withstand up to 500° F. of continuous service provides a sealing composition usable on the hotter areas, while some less expensive elastomers might be usable on the cooler surfaces.

It is well known that cracks may appear at any point in the surface and micro cracks will open wider with time. The modern furnaces are heavily insulated and much of the surfaces to be sealed are now below 350° F.

The criteria Applicant has found is that by using a high temperature resistant elastic coating, an air impervious seal can be made over the areas of the glass melting furnace checkerworks which will result in a significant saving in fuel costs. Furnaces are constructed of refractory bricks and mortar arranged in multiple layers operating at progressively lower temperatures when going from the inside layer to the outside layer, which may be some form of insulation. As the furnace cycles through reversal or, on a longer time scale, through load changes, the layers contract and expand to a differing degree, depending upon the materials and the temperatures. The result of this movement is both micro and macro cracks that the present invention is directed.

While the foregoing description is made in conjunction with a regenerator for a side port furnace for melting glass, it should be apparent that the inventive concept should have application to other types of glass furnaces or other furnaces where the same environment is encountered during operation.

It is intended that such other apparent uses of the concept of this invention be included within the scope of the appended claims.

I claim:

1. The method of sealing the refractory walls of a furnace heat exchanger against the movement of air through the brick works, comprising the step of applying a coating of a flexible, rubber-like material to the external surfaces of the wall portions of the furnace across which air leakage into and out of the furnace occurs.

2. The method of claim 1 wherein said coating is applied in a plurality of layers.

3. The method of claim 1 wherein said coating is applied in plural layers to those portions of the outside wall which are overlying the cleanout ports and panels.

4. The method of preventing substantial intrusion of external air through the cleanout ports of the checkerworks of a regenerator of a glass melting furnace, comprising the steps of sealing the plugs in the ports in the cleanout panels with refractory cement and then coating these plugs and the surrounding outer wall of the regenerator with a rubber-like, high temperature, silicone material.

5. The method of claim 4 further comprising the steps of applying a plurality of coatings of said silicone, rubberlike material.

6. The method of claim 5 wherein the number of coatings is 2–4.

7. The method of claim 6 wherein the number of coatings is 4.

8. The method of claim 4 further including the step of water mist coating the cleanout panels and ports just prior to applying the silicone.

9. The method of sealing a permeable refractory structural wall across which there is a pressure differential, comprising the steps of applying a coating of a high temperature, silicone elastomer to the external surfaces of the wall where significant differential pressure exists between the interior and exterior of the walls thereof, and applying additional coatings to those surface areas where the greatest differential pressure exists.

10. A regenerative glass melting furnace having air preheating regenerators for receiving heated exhaust gases during one cycle of the furnace operation and combustion air during the reverse cycle of furnace operation with cleanout panels located in the walls of the regenerators and opening out to the exterior thereof, the improvement in such furnaces comprising a coating of high temperature, water based silicone elastomer over the external surface of the regenerators to seal the cleanout panels from movement of air therethrough, which coating is of sufficient thickness to prevent air permeating the walls of the regenerators.

* * * * *